Dec. 11, 1962 ENAKICHI HAYASAKA ETAL 3,067,631
NON-STEP VARIABLE ANGULAR VELOCITY RATIO
CONVEYING MECHANISM
Filed March 9, 1959
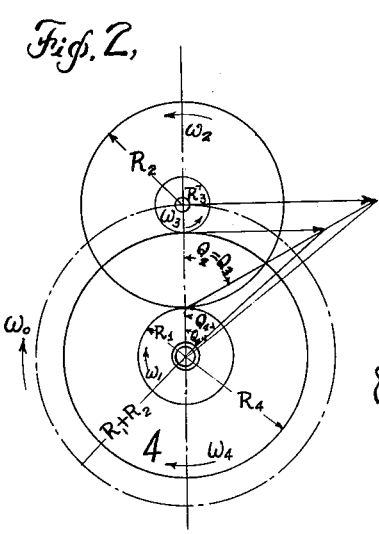
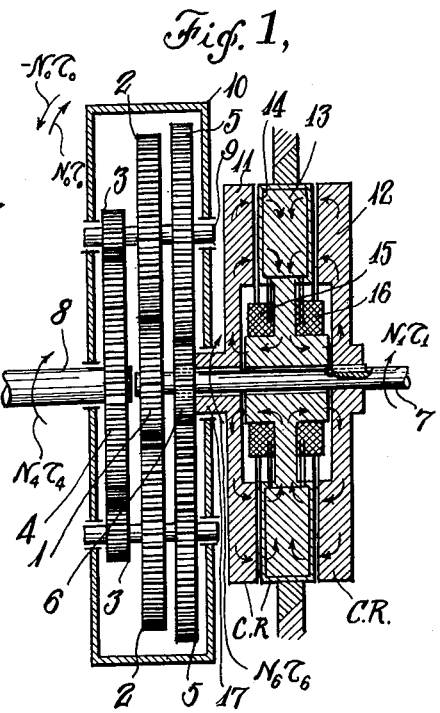
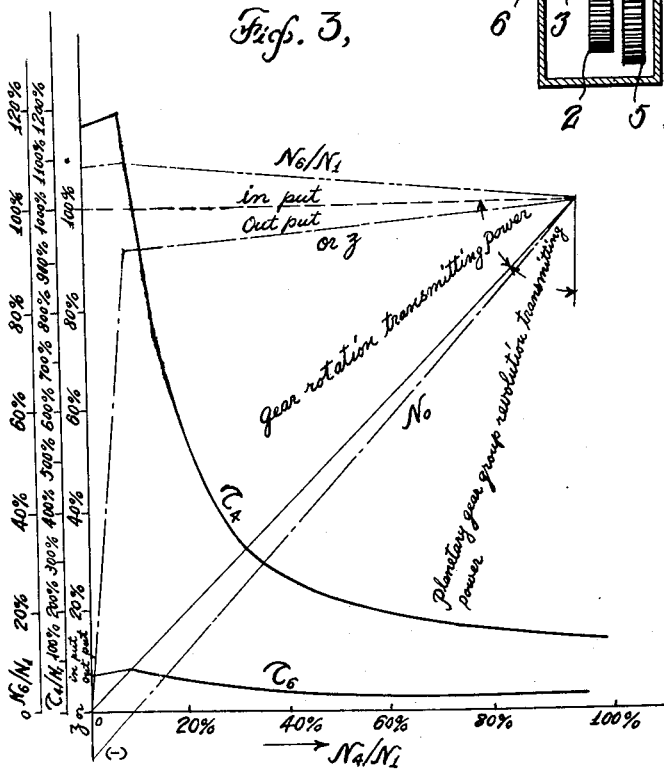
E. HAYASAKA, AND
S. HAYASAKA
INVENTORS
BY Wenderoth, Lind & Ponack
ATTORNEYS

United States Patent Office 3,067,631
Patented Dec. 11, 1962

3,067,631
NON-STEP VARIABLE ANGULAR VELOCITY
RATIO CONVEYING MECHANISM
Enakichi Hayasaka and Shigeaki Hayasaka, both of
No. 231 of Kanaoka House, 52 of 3, Minami-Nagao-
Cho, Sakai City, Osaka-Fu, Japan
Filed Mar. 9, 1959, Ser. No. 798,245
Claims priority, application Japan Mar. 15, 1958
2 Claims. (Cl. 74—686)

The present invention relates to a power conveying mechanism (a torque converter) to be used as a prime mover and having the capacity to convert a constant torque or to produce a constant output for setting an inertia load or other similar load in motion.

Generally, such an electrical or a hydraulic or a mechanical device is constructed as a stepless speed change mechanism, but in most cases it is of rather limited use for overcoming an inertia load from the standpoint of economy and capacity. It is also a well known fact that such an electric or a hydraulic device is controlled by the components of the action phase belt which is a construction element of the machine, and accordingly the machine size becomes larger and larger in proportion to the increase of the torque change ratio, and thus it cannot be put to a practical use easily. Thirdly, in a mechanical gearing mechanism, it is possible to change the torque positively and in a simple way if a proper gear ratio is provided. However, the change cannot be carried out without going through some steps. Fourthly, in the case of the stepless variable speed mechanism of the mechanical type, there is a different motion as between the input circuit and the output circuit because of the use of a planetary gear mechanism or a bevel gear differential mechanism, so that it can be regarded as if it had the effect of bringing about a torque conversion. However, those mechanisms have no particular gear ratio in their mechanical construction, and therefore it cannot be considered that the input torque is fully controlled by such a mechanism.

In order to convert torque by a gear type mechanism, it is necessary to provide radius ratio among the gears. But, when changing their value gradually, the change cannot help being carried out individually. This is called the first link conversion in the gear mechanism, and a movement such as the revolving motion in a planetary gear mechanism is called the second link movement in the gear mechanism. Now, it is impossible to expect to bring about the same effect as the first link conversion by means of converting the second link movement in the above-mentioned case. It can be proved that since the static values of both the first and second link movements are equal, a system which merely adapts an ordinary gear differential mechanism cannot function as a torque converter.

It is an object of the present invention to provide a stepless variable angular velocity ratio conveying mechanism which overcomes the drawbacks of the prior art devices. The device according to the invention has an input shaft and an output shaft aligned with each other, and has a control shaft concentric with the input shaft. There is a sun gear on each of the shafts, the sun gear on the output shaft being larger than the sun gear on the input shaft and the sun gear on the input shaft being larger than the sun gear on the control shaft. There is at least one pair of planet gear shafts provided, and three planet gears are fixed on each of the planet gear shafts and are meshed with the sun gears. The planet gear which is meshed with the sun gear on the output shaft is smaller than the planet gear meshed with the sun gear on the input shaft, and the planet gear meshed with the sun gear on the input shaft is smaller than the planet gear meshed with the sun gear on the control shaft. A carrier means is provided on which the planet gear shafts are mounted, and the carrier means is mounted for rotation around the input and output shafts. There is also provided a braking and energy conversion means mounted between the control shaft and the input shaft, and the control shaft is rotated by the input shaft at a speed which is greater than the speed of the input shaft when a load resistance is imposed on the output shaft.

Thus, in the planetary gear mechanism of the present invention, each gear circuit is made to have a specific gear ratio, and the mechanism also has a special structure which can extract the rotative power of the planetary gear for a control circuit, so that the rotational character of the subordinate movement is diametrically opposite to that of the control circuit while the rotational character of the control circuit is symmetrically the same as that of the restoration circuit. These are the most important features of the present invention.

The invention will now be described in connection with the accompanying drawings in which:

FIG. 1 is a sectional elevation, partly diagrammatic, of an embodiment of the device according to the present invention;

FIG. 2 is a diagram showing the theoretical velocity curve of the gearing of the device of FIG. 1; and FIG. 3 is a diagram of a characteristic curve of the device of FIG. 1 as derived experimentally.

In the following, the construction of a mechanical embodiment of the invention and its functional effects are described. On the input shaft 7 is fixed a sun gear 1, and on the output shaft 8 aligned on the same center line with the input shaft is fixed a sun gear 4. Around the outside of the input shaft 7, is a hollow control shaft 17 having a sun gear 6 mounted thereon. Planet gears 2, 3 and 5 meshing with these sun gears are fixed on planetary gear shafts 9 parallel to the input shaft 7 and the output shaft 8, there being two or three pairs of planetary gear shafts so that the forces set up by their movements may be satisfactorily balanced. These planetary gears are installed inside the gear carrier casing 10 which is mounted on the input and output shafts in such a manner that it may revolve around them. On the control shaft 17 is mounted first rotor 11 of an electromagnetic type of braking and energy conversion means (hereinafter designated as C.R.). Similarly, on the input shaft 7, a second rotor 12 of the C.R. is fixed. Between elements 11 and 12, is a stator 13 within which input shaft is rotatable and which is fixed relative to the machine. Furthermore, on the external circumference of the inner shell of the stator 13 are so-called compound wound coils 15 and 16 consisting of a separately excited D.C. shunt winding and a self-excited series winding. The sides of the stator 13 opposite elements 11 and 12 have coils 14 thereon connected to each other through the series wound coil of the compound wound coils 15 and 16.

The symbols used in FIGS. 2 and 3 in the drawing have meanings as indicated below:

$N_1$—number of revolutions of the input shaft
$\tau_1$—torque of the input shaft
$N_4$—number of revolutions of the output shaft
$\tau_4$—torque of the output shaft
$N_6$—number of revolutions of the control shaft
$\tau_6$—torque of the control shaft
$-N_0$—number of revolutions of the gear carrier casing 10 in the opposite direction as $N_1$.
$+N_0$—number of revolutions of the gear carrier casing 10 in the same direction as $N_1$.
$-\tau_0$—torque of the gear carrier casing 10 in case of $+N_0$.
$+\tau_0$—torque of the gear carrier casing 10 in case of $+N_0$.

The formulas showing the operation of the device may be deduced by the use of a velocity diagram of FIG. 2 for finding velocity generated at each part of the mechanism for a particular driving velocity $N_1$. The values for each gear are as follows:

$R_1$—radius of gear 1
$R_2$—radius of gear 2
$R_3$—radius of gear 3
$R_4$—radius of gear 4
$\omega_1$—angular velocity of gear 1
$\omega_4$—angular velocity of gear 4
$\omega_0$—angular velocity of planetary gear carrier casing 10
$Q_2$—angle of rotation of gear 2
$Q_3$—angle of rotation of gear 3
$Q_4$—angle of rotation of gear 4
$Q_0$—angle of revolution of planetary gear carrier casing 10

The formulas for the velocity of the gears may be obtained from the velocity diagram shown in FIGURE 2. With the gear 1 fixed, the formula for the relation between $\omega_4$ and $\omega_0$ is $$\omega_4 = \frac{R_2 R_4 - R_1 R_3}{R_2 R_4} \omega_0$$

$$= \left(1 - \frac{R_1 R_3}{R_2 R_4}\right) \omega_0$$

Next, fixing the gear carrier casing 10, the formula for the relation between $\omega_4$ and $\omega_1$ is found.

$$\omega_4 = \omega_1 \frac{R_1 R_3}{R_2 R_4}$$

From the two equations given above, the formula for the relation between $\omega_0$, $\omega_1$ and $\omega_4$ may be completed as follows:

$$\omega_4 = \omega_1 \frac{R_1 R_3}{R_2 R_4} + \omega_0 \left(1 - \frac{R_1 R_3}{R_2 R_4}\right) \quad (1)$$

or $$\omega_0 = \frac{\omega_1 \frac{R_1}{R_2} - \omega_4 \frac{R_4}{R_3}}{\frac{R_1}{R_2} - \frac{R_4}{R_3}} \quad (2)$$

Furthermore, the angular velocity is in proportion to the number of revolutions, and accordingly, the equations cited above may be used as a formula representing the number of revolutions N.

In the quite same way as above, the velocity of the control shaft 17 and the gear 6 may be found as follows. Assuming:

$N_6$—number of revolution of the control shaft 17
$R_5$—radius of gear 5
$R_6$—radius of gear 6.

The following equation may be derived, which is quite similar to Equations 1 and 2.

$$N_6 = N_1 \frac{R_1 R_5}{R_2 R_6} + N_0 \left(1 - \frac{R_1 R_5}{R_2 R_6}\right) \quad (3)$$

$$N_0 = \frac{N_1 \frac{R_1}{R_2} - N_6 \frac{R_6}{R_5}}{\frac{R_1}{R_2} - \frac{R_6}{R_5}} \quad (4)$$

In the Equation 4, the values of $R_1$, $R_2$, $R_5$ and $R_6$ are always constant. Assuming $N_1$ is specified, $N_0$ is proportional to the variation of $N_6$. Similarly, $N_0$ is proportional to the change of $N_4$. To obtain a change of $N_4$, it is sufficient to vary $N_6$. Moreover, when $R_5 > R_2$, the maximum value of $N_6$ may be obtained under the condition of $N_6 > N_1$. The scientific embodiment of the present invention as described above has gear sizes in accordance with these conditions:

$$R_5 > R_2 > R_3, \text{ and } R_4 > R_1 > R_6$$

When finding the relative velocities between the gears of the mechanism as described above, the following hypotheses may be set up. Since $N_4$ is a function of $N_6$, $N_4$ is a function of $aN_6 - bN_1$ (provided $a$ and $b$ are constants) when $N_1$ is given. As $N_0$ differs in its velocity from $N_6$ by an amount which at a maximum is equal to $N_1$, namely by the amount corresponding to the relative velocity of C.R. and the related shaft, $N_4$ may be varied from zero to $N_1$. This fact allows the relative velocity to be suitably chosen in designing this mechanism and to be utilized as a factor governing the characteristic and loss of C.R. to be used.

Assuming, then, that the output shaft 8 is held stationary by a load resistance when the particular driving power of $N_1$, $\tau_1$ is applied to the mechanism composed of gears having radii $R_1$, $R_2$, $R_3$, $R_4$, $R_5$ and $R_6$ of suitable values respectively, the gear 3 may revolve around the circumference of the gear 4 and attain a value of $N_0$, the maximum value of velocity in this case. Under such a condition, $N_6$ also attains the maximum value of velocity in the same direction as that of $N_1$. Furthermore, as the mechanism is such that the condition $N_6 > N_1$ may be obtained when $R_5 > R_2$ and consequently $R_6 > R_1$, the value of $N_6 - N_1$ is positive in the same direction as that of the input shaft 7. In this state, C.R. may serve as an electro-magnetic power changer and the element 11 is subjected to mechanical braking only if the excitation coil 15 is energized. A heavy current flows through the current coil 14. Since $N_6$ decreases when the element 11 is subjected to braking, $-N_0$ is also reduced and $N_4$ follows the progress of revolution, overcoming the load resistance. In a planetary gear mechanism of the type composed of gears 1, 2, 3 and 4, the output shaft decomposes the reaction force $$\begin{matrix} \oplus \\ \ominus \end{matrix} \tau_0$$

of the carrier casing 10 delivered by the load resistance before the commencement of the revolution mentioned above. In terms of the problem in the pair made up of the planet gear 3 and the sun gear 4 on the output shaft 8, the planet gear 3 advances toward the progressive direction of gear teeth. Accordingly, when dealing with the revolution of the planet gear 3, it may be considered to be the same as the planetary gear shaft 9 in the form of rotation. That is, if the torque of rotation acting on this shaft is maintained in a state of equilibrium, the reaction force mentioned above may be omitted. This effect is clearly explained in accordance with the definition of couple in a revolving body. In that case, the state of equilibrium of the rotation torque mentioned above has the same effect as the direct braking of the gear carrier casing 10, or the braking of rotation of the planetary shaft 9, which in turn may be accomplished by the braking of the control shaft 17. The following equation, thus, may be set down.

$N_4 \tau_4 = N_6 \tau_6 = N_1 \tau_1$ (provided that losses are negligible.)

In terms of statics, the magnitude of the external force required for braking may be equal to $\tau_6$ in inverse proportion to the absolute value of $N_6$. With the revolution of the gear carrier casing being accelerated from $N_0 = 0$ to $\oplus N_0$, the revolution velocity is increased, as the rotation velocity of the planetary gear shaft 9 is decreased with respect to the values of $N_6$. In this case the value of the restraining external force corresponding to $\tau_6$ may be reduced in proportion to the reduction of the rotation velocity. Namely, as $\tau_4$ is reduced in inverse proportion to $N_4$, the external force restraining the planetary gear shaft 9 may naturally be diminished. In the mechanism of the present invention, it is thus quite easy to use various types of stepless speed changers mentioned above as a means having a capacity to exert the braking force proportional to the relative velocity of $N_6 - N_1$, regardless of whether the C.R. used as the interlocking mechanism is a friction, fluid or electric type. Presuming that the control force matching the external force applied to the control shaft 17 does not involve any quantity of work achieved, the following equation can be derived: $N_1 \tau_1 = N_4 \tau_4$ (providing that the velocity of $$N_4 = N_1 \frac{R_2 R_4}{R_1 R_3}$$

is exceeded).

In the present embodiments of the braking mechanism, the opposing faces of the first rotor 11 and stator 13 are on the generator side of the braking and energy conversion device and opposing faces of the second rotor 12 and stator 13 are on the motor side. When the excitation coil 15 is energized, the magnetic flux is generated in the circuit as shown by the arrows in FIG. 1, and the current coil 14 is crossed by the magnetic flux, thereby causing the current to flow in coils 14. In this case, the first rotor 11 is subjected to the restraint proportional to the current but opposing the direction of revolution if the magnetic flux is constant. On the other hand the current passing through the current coil 14 also runs through current coils between the opposing faces of the second rotor 12 and the stator 13 and within both excitation coils. Consequently, the element 12 is subjected to the moment in the same direction as that of revolution (in this case, no work is performed because there is no acceleration), the revolving force being recovered by the drive shaft. Moreover, the magnetic flux is simultaneously varied in this case. Accordingly, it is easy to provide an electric braking device with a capacity such that the value of the current passing through the current coil 14 may be an exponential function of the relative velocity. It follows from this fact that $\tau_4$ following the variation of $N_4$ and the restraining force of the carrier casing 10 proportional to $\tau_4$ may satisfactorily be regulated by C.R.

In the above description, it has been assumed that the braking effect caused by the external force from the first rotor 11 would not involve any loss of power. In the arrangement mentioned above, if the second rotor 12 is subjected to the moment in the same direction as that of revolution, this force is delivered to the first rotor 11 through the drive shaft 7, gear 1, gear 2, planetary gear shaft 9, gear 5, gear 6 and control shaft 17. Consequently, a state of equilibrium of the force is maintained through the C.R. The force on the first rotor 11 produced in this manner is different from the original driving force. This force, thus, is comparable to the compression force of a spring acting on a friction disc type coupling, for example. The C.R. as shown in FIG. 1 is designed in such a way that both elements may be operated at a synchronized velocity by the mutual speed change between these elements and their coupling may not involve any quantity of work to be achieved. In this way, the braking can be achieved in a manner which does not involve any quantity of work to be carried out similarly to that used in the hypotheses mentioned above.

The functions so far stated refer to the case where the planetary gear carrier casing speeds up from its stationary state to $\oplus N_0$, namely, to the upward movement of the velocity of the output shaft $N_4$ starting from the velocity of $$N_1 = \frac{N_2 N_4}{N_1 N_3}$$

With respect to the functions in the process where $N_4$ rises from zero to $$N_1 = \frac{N_2 N_4}{N_1 N_3}$$

all or a portion of the driving force may not be transmitted from the planet gear 3 to the sun gear 4. Furthermore, in the meantime, the revolving force $\tau_4$ of the output shaft is constant. The loss of the transmissive power due to the meshing of both gears mentioned above is due to the energy consumed in accordance with the direction of movements and is frequently found in planetary gear mechanisms. In the mechanism of the present invention, however, the effect mentioned above is interrupted immediately after the start of rotation of the output shaft and all directions of movements become plus. Consequently, the deterioration in the transmission efficiency due to the difference in the momenta in the meshing of gears is absent.

Referring to the operational conditions of this mechanism, $N_6$ is reduced when the revolving force of the output shaft overcomes the load resistance. On the contrary, $N_4$ is reduced and $N_6$ is accelerated when the load resistance is increased. Furthermore, the reactionary moment of the C.R. is regulated, and thus attains a state of equilibrium at a velocity suitable for the load, thereby conveying a constant driving force. The regulation of the magnitude of the driving force of the C.R. as shown in the embodiment of FIG. 1, may effectively be accomplished by controlling the value of current passing through the excitation coil. In this way, the output shaft may be brought to a state of equilibrium at a specified number of revolutions. As a rule, the mechanical capacity of the C.R. to the drive conveying force is $$\frac{N_6 - N_1}{N_1}$$

If the said value of the gearing capable of conveying 50 horsepower in accordance with the present invention is 10%, a C.R. rated at 5 horsepower may suffice. Accordingly, if the mechanical efficiency of the C.R. mechanism is 85%, the efficiency of the power transmitted to the output shaft may attain quite a high value of 98.5%. Moreover, the value mentioned above is for the part having an unsatisfactory efficiency at lower speed. Since the control horsepower of the C.R. may be reduced with the increase of velocity, the efficiency approaches 100%.

In the above description of each embodiment, the C.R. having an electrical and special construction was cited.

Various other well-known manual or automatic speed changing or sliding mechanisms of the electric, friction or fluid type may be used in place of the C.R. of the present invention without making any alterations to the mechanisms.

FIGURE 3 illustrates the experimental characteristic curve of an embodiment of the present invention. This record was obtained from an experiment where a mechanism equipped with an electric slidable interlocking device having a reduction rate of 1 to 12 is operated with a drive input of 10 horsepower at 1000 r.p.m.

What we claim as our invention:

1. A stepless speed change torque converter comprising an input shaft and an output shaft aligned with each other, a control shaft concentric with said input shaft, a sun gear on each of said shafts, the sun gear on said output shaft being larger than the sun gear on the input shaft and the sun gear on the input shaft being larger than the sun gear on the control shaft, at least one pair of planet gear shafts, three planet gears fixed on each of said planet gear shafts and meshed with said sun gears, the planet gear meshed with said sun gear on said output shaft being smaller than the planet gear meshed with said sun gear on said input shaft, and said planet gear meshed with said sun gear on said input shaft being smaller than the planet gear meshed with the sun gear on said control shaft, a carrier means on which said planet gear shafts are mounted, said carrier means rotatably mounted for rotation around said input and output shafts, and a braking and energy conversion means mounted between said control shaft and said input shaft, whereby said control shaft is rotated by said input shaft at a speed which is always greater than the speed of said input shaft when a load resistance is imposed on said output shaft.

2. A torque converter as claimed in claim 1 in which said braking and energy conversion means comprises a first rotor mounted on said control shaft, a stator mounted in a fixed position adjacent said first rotor, and a second rotor mounted on said input shaft adjacent said stator, said stator having a separately excited shunt winding thereon, and a self excited series winding, said self excited series winding having a plurality of coils the parts of which pass between said first rotor and said stator and between said stator and said second rotor, whereby when said separately excited coil is excited, a flux is caused to pass from said first rotor through said stator across said plurality of coils, and a flux is caused to pass from said stator through said second rotor across said plurality of coils.

References Cited in the file of this patent

UNITED STATES PATENTS

| | | |
|---|---|---|
| 1,076,614 | Thomas | Oct. 21, 1913 |
| 1,515,321 | Ahlm et al. | Nov. 11, 1924 |
| 2,235,370 | Jandasek | Mar. 18, 1941 |
| 2,600,592 | Watson | June 17, 1952 |
| 2,737,062 | Kiss | Mar. 6, 1956 |
| 2,750,812 | Mirone | June 19, 1956 |
| 2,941,421 | Plotti | June 21, 1960 |